US012585445B2

(12) United States Patent
Schlicher et al.

(10) Patent No.: US 12,585,445 B2
(45) Date of Patent: Mar. 24, 2026

(54) METHOD, SYSTEM AND COMPUTER PROGRAM PRODUCT FOR CODING, BUILDING, AND AUTOMATING A STATE MACHINE APP WITH DISTRIBUTED STATE SERVICES

(71) Applicant: AVC Innovations LLC, Spearfish, SD (US)

(72) Inventors: Bob G. Schlicher, Knoxville, TN (US); David J. Todd, Spearfish, SD (US); Niels C. Skjoldager, Seminole, FL (US); Shaikha Dheya Ebrahim Al Khalifa, Manama (BH)

(73) Assignee: AVC INNOVATIONS LLC, Spearfish, SD (US)

( * ) Notice: Subject to any disclaimer, the term of this patent is extended or adjusted under 35 U.S.C. 154(b) by 288 days.

(21) Appl. No.: 18/600,618

(22) Filed: Mar. 8, 2024

(65) Prior Publication Data

US 2025/0021318 A1     Jan. 16, 2025

Related U.S. Application Data

(60) Provisional application No. 63/526,931, filed on Jul. 14, 2023.

(51) Int. Cl.
 *G06F 8/60*     (2018.01)
 *G06F 9/448*    (2018.01)
(52) U.S. Cl.
 CPC .............. *G06F 8/60* (2013.01); *G06F 9/4498* (2018.02)
(58) Field of Classification Search
 None
 See application file for complete search history.

(56) References Cited

U.S. PATENT DOCUMENTS 7,716,619 B2    5/2010   Braceras et al.
9,855,785 B1    1/2018   Nagelberg et al.
         (Continued)

FOREIGN PATENT DOCUMENTS

EP        1906301 A1 *   4/2008   ........... G06F 9/4498

OTHER PUBLICATIONS

Badreddin, "Enhanced Code Generation from UML Composite State Machines", 2014, IEEE (Year: 2014).*
ISR & WO from PCT/US 24/ 19448 with four references.

*Primary Examiner* — Hossain M Morshed
(74) *Attorney, Agent, or Firm* — Reston Law Group, LLP; Ralph P. Albrecht

(57) ABSTRACT

A method codifies data, programs, rule-based, state-based application software for automatic deployment, in distributed computing environment, including programming/assignment Production Rules as code for processing data/events for cargo port shipments, through Customs and Finance Processing referred to as supply chain financing; programming and deploying FiniteStateMachine (FSM) implementing state-based application components; deployment is collection of distributed software AppNodeServices (ANS) that collectively comprise an FSM. Each AppNode is at least a single state of FSM. AppNode contains programmable Rules loadable dynamically through the processes. Shipment data is received and collected from one or more data sources including Electronic Data Interchange (EDI), other Enterprise Resource Planning (ERP) messaging, web service Application Programming Interface (API) calls, Internet Of Things (IoT) messaging, remote file copies, and tracking sensors. SmartPass is aggregation of shipment data combined with rule processing, FSM, and associated processing actions, and is used to dynamically assign rules on individual shipment and pre-determined needs basis.

15 Claims, 6 Drawing Sheets

(56) References Cited

U.S. PATENT DOCUMENTS

| | | | |
|---|---|---|---|
| 10,505,726 B1 | 12/2019 | Andon et al. | |
| 10,540,654 B1 | 1/2020 | James et al. | |
| 10,614,661 B2 | 4/2020 | Doney et al. | |
| 10,789,239 B2 * | 9/2020 | Ventura | G06F 16/235 |
| 10,951,409 B2 | 3/2021 | Konda et al. | |
| 10,972,274 B2 | 4/2021 | Redpath et al. | |
| 10,991,185 B1 | 4/2021 | Luthra et al. | |
| 11,038,718 B2 | 6/2021 | Simons | |
| 11,048,788 B2 | 6/2021 | Witchey et al. | |
| 11,070,564 B2 | 7/2021 | McIver et al. | |
| 11,138,580 B1 | 10/2021 | Koch | |
| 11,170,092 B1 | 11/2021 | Liang | |
| 11,171,782 B2 | 11/2021 | Tang et al. | |
| 11,200,569 B1 | 12/2021 | James et al. | |
| 11,875,288 B2 * | 1/2024 | Sailer | G06Q 10/06313 |
| 2004/0221162 A1 | 11/2004 | Kongtcheu | |
| 2009/0077386 A1 | 3/2009 | Simonian | |
| 2016/0283920 A1 | 9/2016 | Fisher et al. | |
| 2016/0335593 A1 * | 11/2016 | Clarke | G06Q 10/0833 |
| 2017/0046664 A1 | 2/2017 | Haldenby et al. | |
| 2019/0130416 A1 | 5/2019 | Boudville et al. | |
| 2019/0279197 A1 * | 9/2019 | Wright | H04L 9/0637 |
| 2020/0280444 A1 | 9/2020 | Tang et al. | |
| 2020/0294128 A1 | 9/2020 | Cella | |
| 2021/0165810 A1 * | 6/2021 | Yang | G06F 16/2315 |
| 2022/0058633 A1 | 2/2022 | Yantis et al. | |
| 2022/0253868 A1 | 8/2022 | Scarseli | |
| 2023/0281322 A1 * | 9/2023 | Powers | G06F 21/577 |
| | | | 726/25 |
| 2025/0021350 A1 * | 1/2025 | Schlicher | G06F 9/4498 |

* cited by examiner

600

METHOD, SYSTEM AND COMPUTER PROGRAM PRODUCT FOR CODING, BUILDING, AND AUTOMATING A STATE MACHINE APP WITH DISTRIBUTED STATE SERVICES

BACKGROUND OF THE DISCLOSURE

Field of the Disclosure

The invention relates generally to state machines and more particularly to methods for programming a finite state machine (FSM).

Related References

FIG. 1 provides an illustration of the SmartPass FSM Framework with the capabilities of a conventional finite state machine (FSM).

Rule Set Development Tools: facilitates users to create, edit, build, and test FSM code and Rule Sets operating independently of the deployment infrastructure and enables a simpler environment for test and verification.

FSM App Node Deployer: performs automated componentization of the FSM and Rule Set code and specifications into a packaged format for processing by the App Node Service.

Container Orchestration Platform: automates many of the manual processes involved in deploying, managing, and scaling applications based on container technologies.

Container Cluster: computing platform that hosts application services as containers and where a Cluster Manager assigned to the platform operates the lifecycle of containers and the underlying platform support services.

FIG. 1 also illustrates a one-for-one relationship between a State in the example FSM diagram and specifications and the deployed App Node Service. For the example SmartPass FSM in the diagram, the arrows show the mapping for a subset of the states in the FSM to the services running in the Container Cluster.

"Start SmartPass" to "04 Start SmartPass" Service
"In Transit" to "06 Shipment In_Transit" Service
"Ready For Customs" to "05 Shipment Ready_for_customs" Service A finite-state machine (FSM) or finite-state automaton (FSA) or plural, automata, finite automaton, or simply a state machine, may include a mathematical model of computation. An FSM may be directed to an abstract machine that can be in exactly one of a finite number of states at any given time. The FSM can change from one state to another in response to some inputs; the change from one state to another is called a transition. An FSM is defined by a list of its states, its initial state, and the inputs that trigger each transition. Finite-state machines may include one of two types—a deterministic finite-state machines and a non-deterministic finite-state machines. A deterministic finite-state machine can be constructed equivalent to any non-deterministic one.

The behavior of conventional state machines can be observed in many devices in modern society that perform a predetermined sequence of actions depending on a sequence of events with which they are presented. Simple examples may include, e.g., but are not limited to: vending machines, which dispense products when a proper combination of coins is deposited; elevators, whose sequence of stops may be determined by the floors requested by riders; traffic lights, which may change sequence when cars are waiting; combination locks, which may require the input of a sequence of numbers in the proper order, etc.

The finite-state machine has less computational power than some other models of computation such as the Turing machine. The computational power distinction means there are computational tasks that a Turing machine can do but an FSM cannot. This is because an FSM's memory is limited by the number of states it has. A finite-state machine has the same computational power as a Turing machine that is restricted such that it may only perform "read" operations, and always has to move from left to right. FSMs are studied in the more general field of automata theory.

Improved systems that overcome shortcomings of the conventional systems are needed.

SUMMARY OF THE INVENTION

According to an example embodiment, a system, method and/or computer program product may be set forth including an example computer implemented method of codifying data or a program using a rule-based and state-based application program or software component for automatic deployment in a distributed computing environment, may include at least one electronic computer processor coupled to at least one electronic memory storage device and coupled via at least one communications network interface to at least one data communications network, the method may include: programming and assigning, by the at least one electronic computer processor, of production rules as code used for processing data and events for shipment of various cargo at a port through customs processing and shipment finance processing referred to as supply chain financing in the distributed computing environment; programming, by the at least one electronic computer processor, a finite state machine (FSM) to implement the state-based application program or software component; deploying, by the at least one electronic computer processor, the FSM may include: collecting, by the at least one electronic computer processor, of at least one distributed software app node service; where each of the at least one distributed software app node services may include: at least a single state of the FSM; and at least one dynamically loadable programmable rule; and receiving, by the at least one electronic computer processor, at least one shipment or shipment related data, where the at least one shipment data may include data collected from at least one or various data sources. In an example embodiment, the one or various data sources may include at least one or more of: electronic data interchange (EDI), other Enterprise Resource Planning (ERP) messaging, web service application programming interface (API) calls, Internet Of Things (IoT) messaging, remote file copy, or tracking sensors, according to an example embodiment.

According to another example embodiment, the method may include where the at least one shipment data may include: aggregating, by the at least one electronic computer processor, the at least one shipment data may include at least one SmartPass may include the at least one shipment data combined with the at least one dynamically loadable programmable rule, the FSM, and associated processing actions, where the at least one SmartPass may include dynamically assigning, by the at least one electronic computer processor, the at least one dynamically loadable programmable rule based on at least one or more of: the at least one shipment data of an individual shipment, or a predetermined need, according to an example embodiment.

According to yet another example embodiment, a system of codifying data or a program using a rule-based and state-based application program or software component for automatic deployment in a distributed computing environment, the system may include: at least one electronic computer processor, coupled to at least one electronic memory storage device and coupled via at least one communications network interface, coupled to at least one data communications network, the system may include where the at least one electronic computer processor is configured to: program and assign of production rules as code used for processing data and events for shipment of various cargo at a port through customs processing and finance processing referred to as supply chain financing in the distributed computing environment; program a finite state machine (FSM) to implement the state-based application program or software component; and deploy the FSM may include: collect of at least one distributed software app node service; where each of the at least one distributed software app node services may include: at least a single state of the FSM; and at least one dynamically loadable programmable rule; and receive at least one shipment data, where the at least one shipment data may include data collected from various data sources, where the various data sources may include at least one or more of: electronic data interchange (EDI), other Enterprise Resource Planning (ERP) messages, web service application programming interface (API) calls, Internet Of Things (IoT) messages, remote file copy, or tracking sensors, according to an example embodiment.

According to one example embodiment system, the at least one shipment data may include where the at least one electronic computer processor is configured to: aggregate the at least one shipment data may include at least one SmartPass may include the at least one shipment data combined with the at least one dynamically loadable programmable rule, the FSM, and associated processing actions, where the at least one SmartPass may include dynamically assigns the at least one dynamically loadable programmable rule based on at least one or more of: the at least one shipment data of an individual shipment, or a pre-determined need, according to an example embodiment.

According to another example embodiment, a computer program product embodied on a computer accessible non-transitory storage medium, may include at least one instruction, which when executed on at least one electronic computer processor may perform a method of codifying data or a program using a rule-based and state-based application program or software component for automatic deployment in a distributed computing environment, may include at least one electronic computer processor coupled to at least one electronic memory storage device and coupled via at least one communications network interface to at least one data communications network, the method may include: programming and assigning of production rules as code used for processing data and events for shipment of various cargo at a port through customs processing and finance processing referred to as supply chain financing in the distributed computing environment; programming a finite state machine (FSM) to implement the state-based application program or software component; deploying the FSM may include: collecting of at least one distributed software app node service; where each of the at least one distributed software app node services may include: at least a single state of the FSM; and at least one dynamically loadable programmable rule; and receiving at least one shipment data, where the at least one shipment data may include data collected from at least one or various data sources. In one example embodiment, the computer program product may include, where the one or various data sources may include at least one or more of:

electronic data interchange (EDI), other Enterprise Resource Planning (ERP) messaging, web service application programming interface (API) calls, Internet Of Things (IoT) messaging, remote file copy, or tracking sensors, according to an example embodiment.

According to one other example embodiment, the computer program product may include where the method may include where the at least one shipment data may include: aggregating the at least one shipment data may include at least one SmartPass may include the at least one shipment data combined with the at least one dynamically loadable programmable rule, the FSM, and associated processing actions, where the at least one SmartPass may include dynamically assigning the at least one dynamically loadable programmable rule based on at least one or more of: the at least one shipment data of an individual shipment, or a pre-determined need.

According to another example embodiment, the method may include where the at least one shipment data may include: electronically aggregating said at least one shipment data comprising at least one SmartPass comprising said at least one shipment data combined with said at least one dynamically loadable programmable rule, the FSM, and associated processing actions, wherein said at least one SmartPass comprises electronically dynamically assigning said at least one dynamically loadable programmable rule based on at least one or more of: said at least one shipment data of an individual shipment, or a pre-determined need.

According to another example embodiment, the method may include where the electronically deploying the FSM comprises electronically deploying at least one app node service.

According to another example embodiment, the method may include where the at least one app node service comprises a YAML App Node Service, and wherein said deploying comprises at least one or more of: electronically deploying to a run-time service environment; wherein said YAML App Node Service comprises being automatically code generated based on a YAML form template design, wherein said YAML form template design is designed specifically for said YAML App Node Service based on a differing Rule Set contents and unique FSM state name; wherein said YAML App Node Service comprises a cluster service comprising at least one or more of: a cluster container manager, a processor of at least one cluster service API deployable as a container cluster service, or a KUBERNETES container cluster service; or electronically creating and deploying a newly created and deployed FSM state-based Rules and App Node Services in a cluster environment, with managed KUBERNETES containers; electronically installing a change to a Rule Set of a running App Node Service, a new App Node Service with a new Asset State Engine instance, and creating an updated Rule Set executed in a Container Cluster; electronically executing a new App Node Service alongside an older version App Node Service, with no interaction between said App Node Services in the same environment, wherein both said App Node services are executing at the same time, at least one other service using said App Node Services comprise at least one or more of: electronically interacting with said new App Node Service; or electronically interacting with said old App Node Service.

Although the invention may be illustrated and described herein as summarized in a transaction on blockchain for at least one loadable programmable rule, the invention should not be limited to the details shown in those embodiments because various modifications and structural changes may be made without departing from the spirit of the invention while remaining within the scope and range of equivalents, according to an example embodiment.

The construction and method of operation of the invention and additional objects and advantages of the invention may be best understood from the following description of specific embodiments when read in connection with the accompanying drawings, according to an example embodiment.

BRIEF DESCRIPTION OF THE VARIOUS EXAMPLE VIEWS OF THE DRAWINGS

This present disclosure will be fully understood with reference to the following detailed description when taken in conjunction with the figures, herein:

Figure 3:
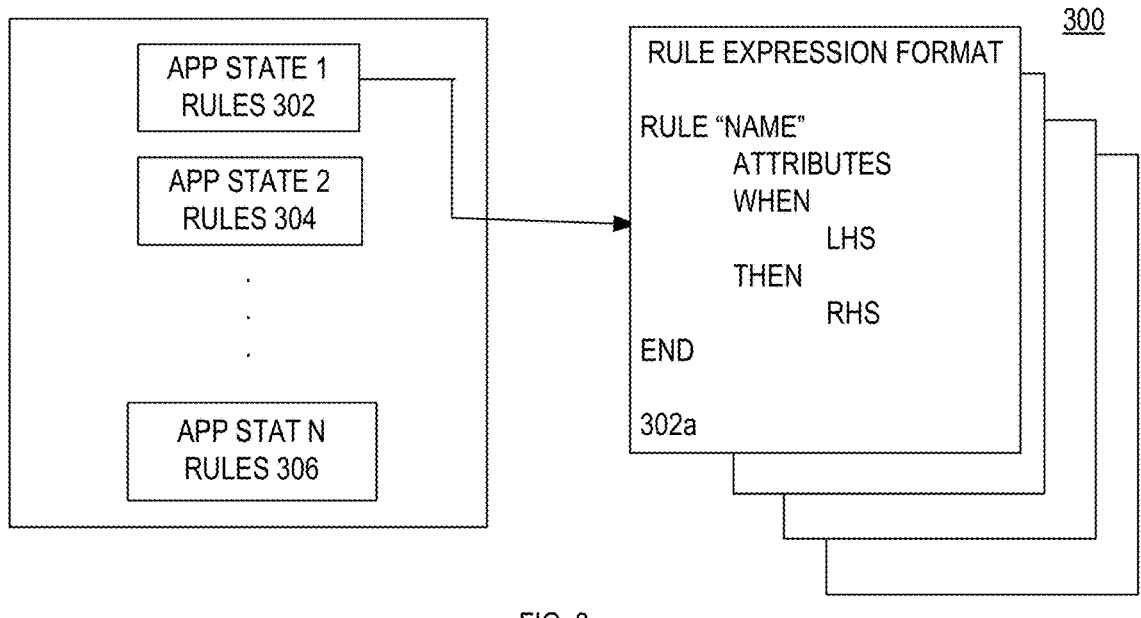
Figure 4:
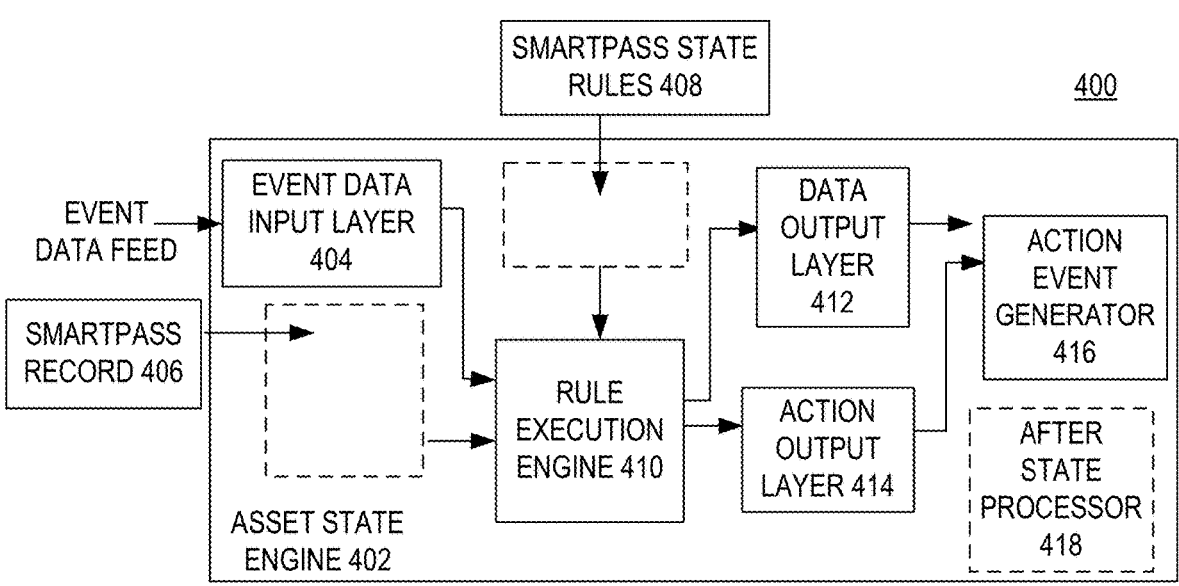
Figure 5:
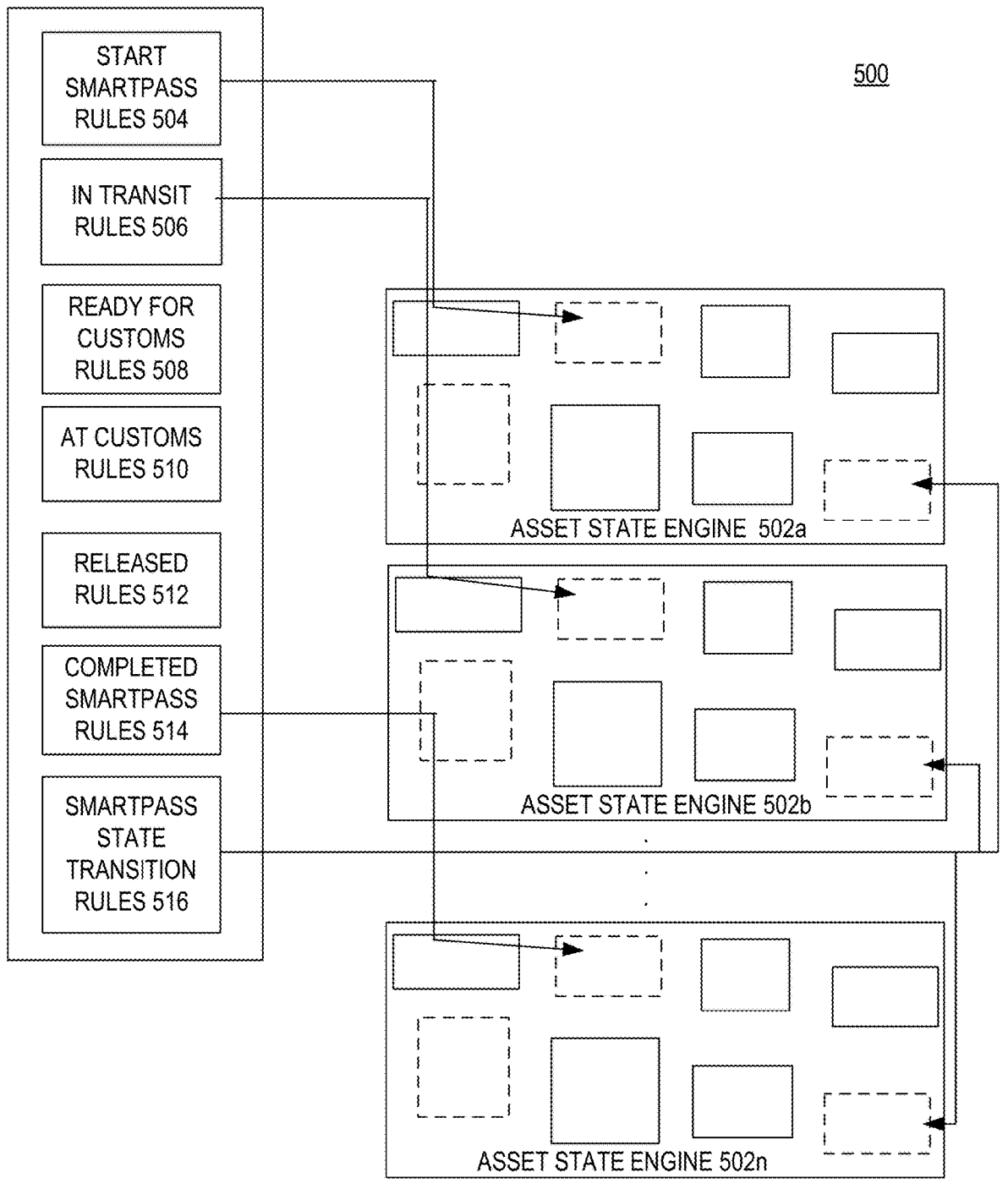
Figure 6:
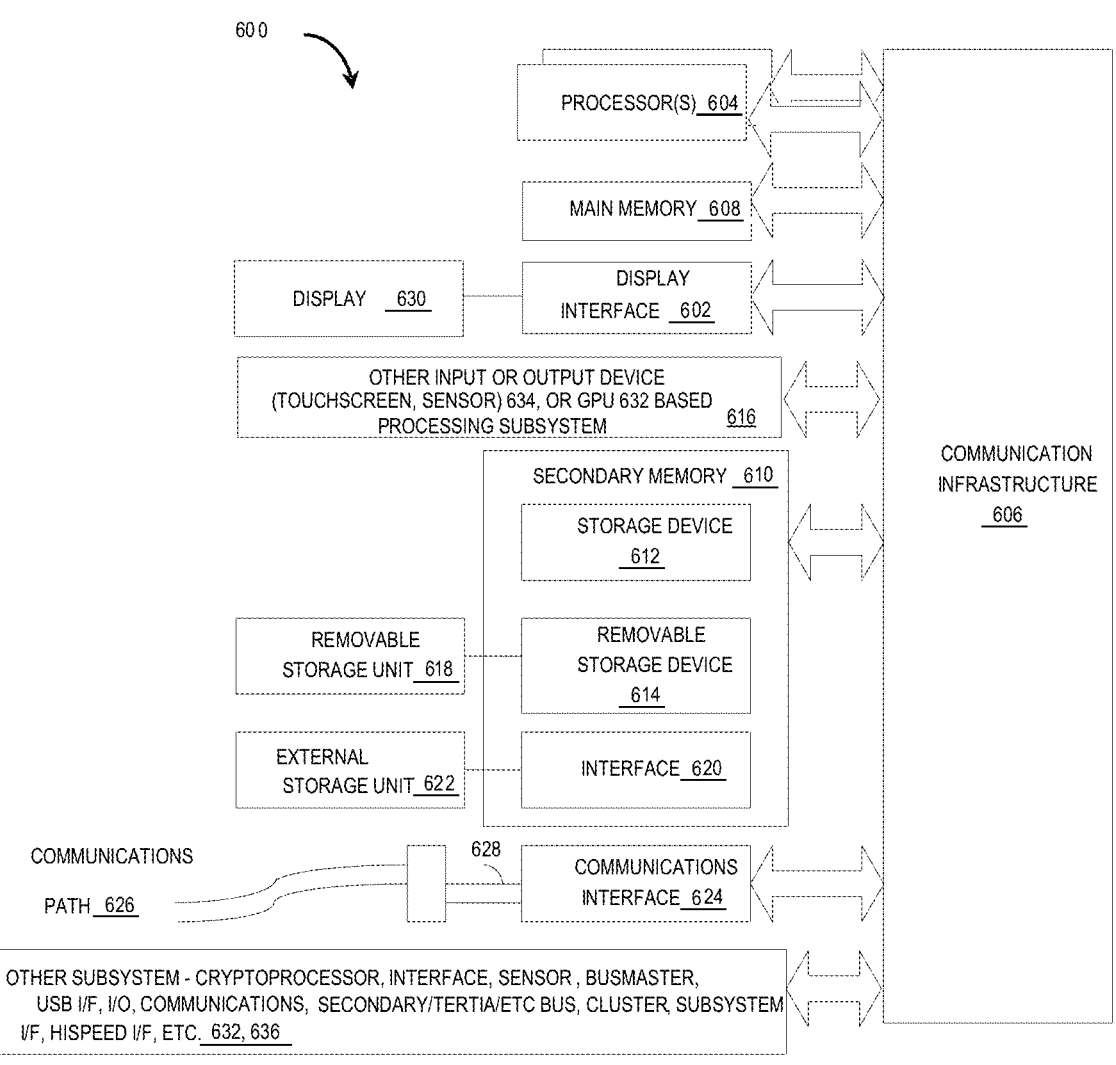
Figure 7:
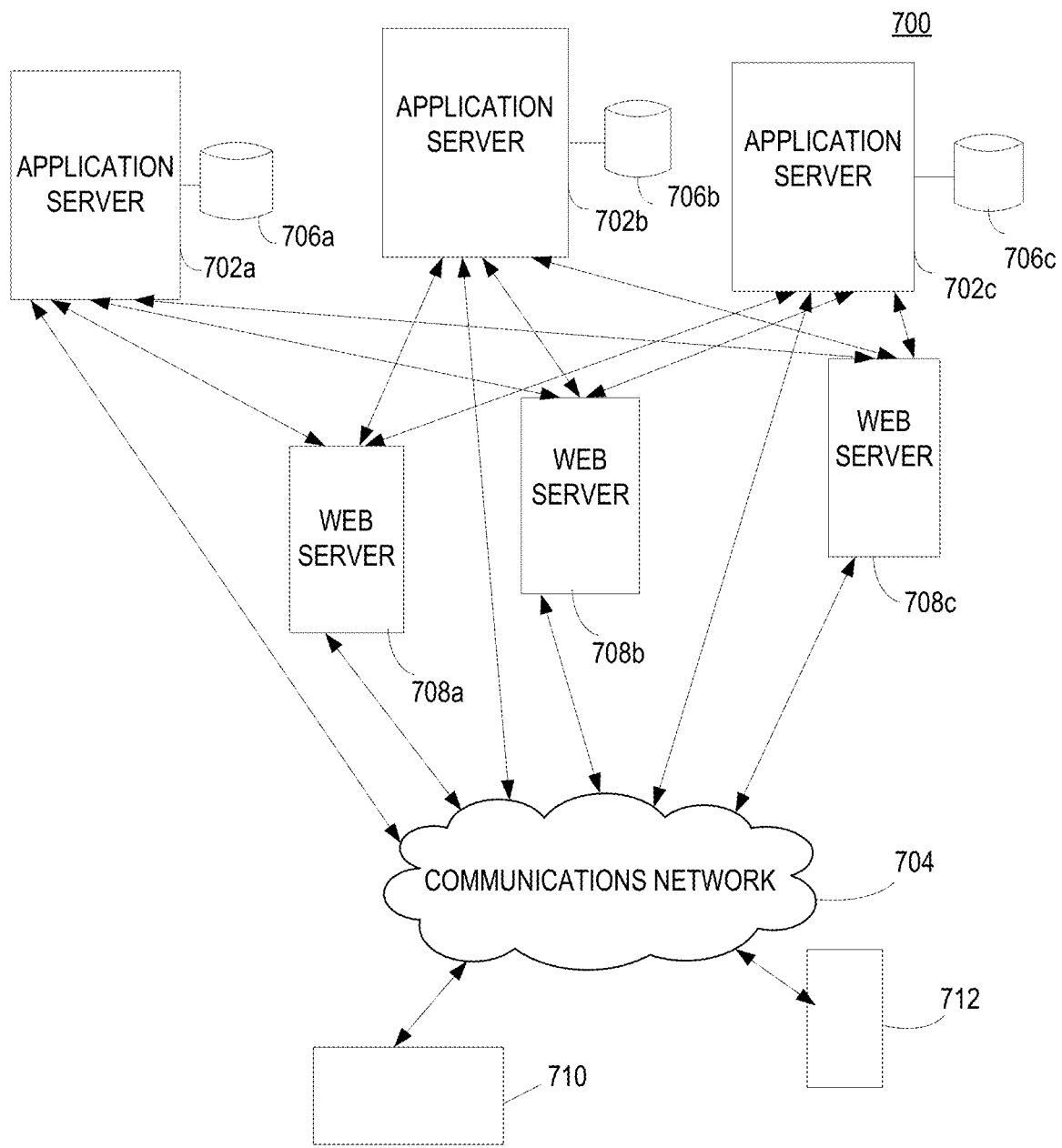

FIG. 3 provides an illustration for the structure of a file saved with the Rules and organized by the App States of an FSM, according to an example embodiment;

FIG. 4 shows a block diagram for an Asset State Engine, according to an example embodiment;

FIG. 5 is a black representation showing on the left side, the Rule Sets assigned for each SmartPass FSM state with some of these Rule Sets assigned to different Asset State Engines on the right side of the diagram, according to an example embodiment;

FIG. 6 depicts an example embodiment of an example component level example hardware architecture for an example computing device as may be used for any of various example hardware subsystem components of an example system, according to one example embodiment; and FIG. 7 depicts an example embodiment illustrating an example system level hardware architecture for an example application server, web server embodiment of an example service provider system for providing an example software architecture of various example subsystem components of an example networking system, which may be used to implement, according to one example embodiment.

DETAILED DESCRIPTION OF EXAMPLE EMBODIMENTS OF THE INVENTION

The various embodiments of the invention described herein should not be limited to the description, even with reference to the accompanying figures and drawings depicted, but only with respect to the claims. The invention may be embodied in different forms and should not be restricted as set forth here.

The various embodiments of the invention described herein should not be limited to the description, even with the reference to the accompanying figures and drawings depicted herein, according to an example embodiment. The invention may be embodied in different forms and should not be restricted at set forth, according to an example embodiment. The following provides a logical view of the system, according to an example embodiment.

Figure 1:
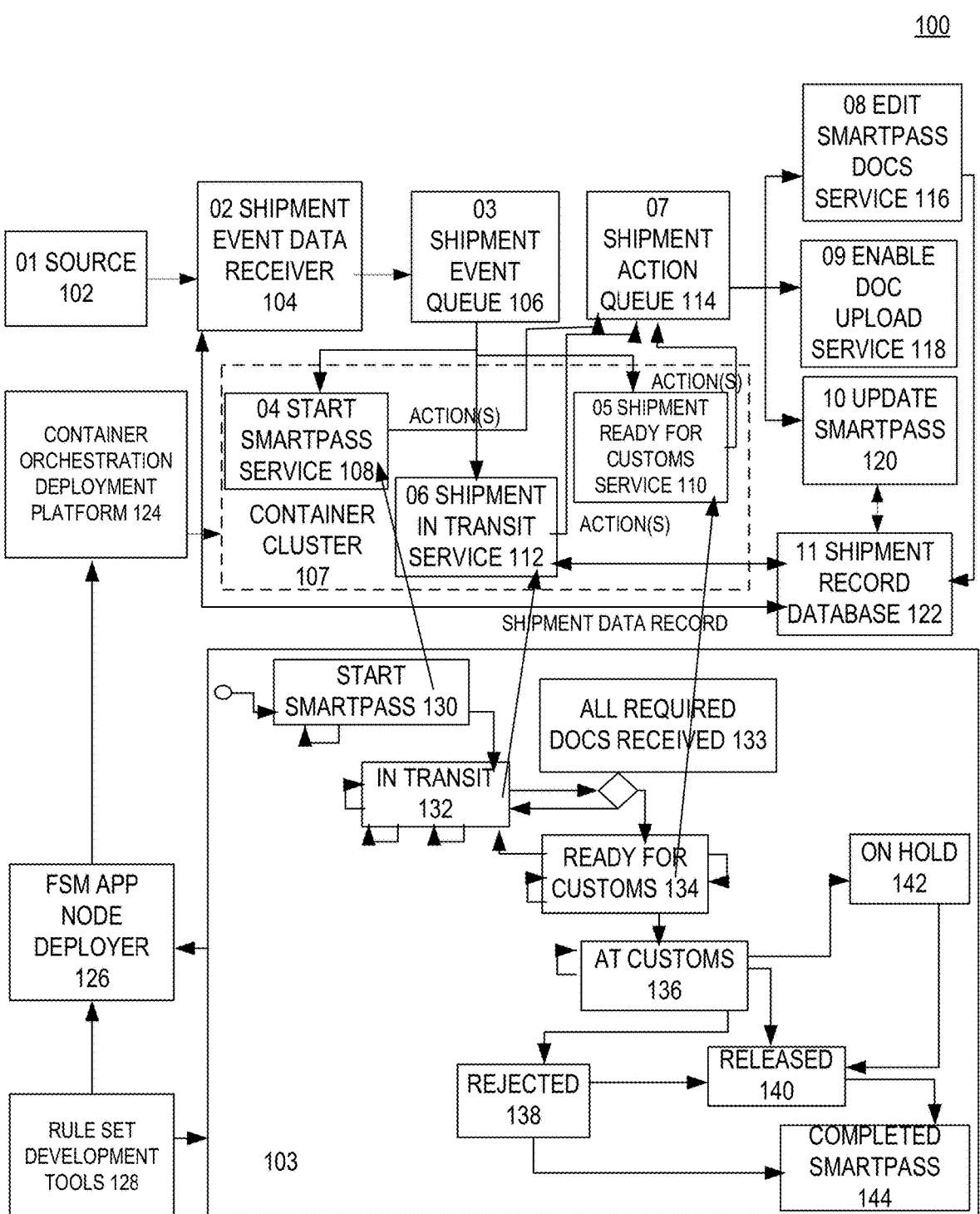
FIG. 1 is a flowchart showing a SmartPass finite state machine according to conventional references, according to an example embodiment.

FIG. 1 is a flowchart 100 showing a SmartPass finite state machine according to conventional references according to an example embodiment discussed further below.

Source 102 Depicts the origin of the SmartPass finite state machine as it continues to the shipment event data receiver 104 according to an example embodiment.

Shipment Event Data Receiver 104 Depicts the process of receiving info from the source 102 and the shipment record database 122 as it continues to the shipment event queue 106 according to an example embodiment.

State Transition Matrix 103 Depicts the resulting finite state machine, composed of the states start SmartPass 130, in transit 132, ready for customs 134, at customs 136, rejected 138, released 140, on hold 142, and completed SmartPass 144, created from the rule set development tools 128, according to an example embodiment. According to an example embodiment, the rule set may pre-determine a range of states through which the state machine may pass, and may include a range of rules and events/actions through which the process may move from state to state.

Shipment Event Queue 106 Depicts the queue of shipment events that take place in the container cluster 107, which are start SmartPass 108, shipment ready for customs 110, and shipment in transit 112, according to an example embodiment.

Start SmartPass Service 108 Depicts a service at a specific point in the state transition matrix 103 in the container cluster 107, with actions set to the shipment action queue 114 according to an example embodiment.

Shipment Ready_for_Customs Service 110 Depicts a service at a specific point in the state transition matrix 103 in the container cluster 107, with actions set to the shipment action queue 114 according to an example embodiment.

Shipment In_Transit Service 112 Depicts a service at a specific point in the state transition matrix 103 in the container cluster 107, with actions set to the shipment action queue 114 according to an example embodiment.

Shipment Action Queue 114 Depicts the queue of actions of the services in the container cluster 107, which are start SmartPass 108, shipment ready for customs 110, and shipment in transit 112, which leads to the editing of SmartPass document 116, enables the document upload 118, and update SmartPass 120, according to an example embodiment.

Edit SmartPass Docs Service 116 Depicts the service that edits the SmartPass documents in the shipment record database 122 according to an example embodiment.

Enable Doc Upload Service 118 Depicts the service that enables the uploading of documents according to an example embodiment.

Update SmartPass Service 120 Depicts the service that updates the SmartPass service in the shipment record database 122 according to an example embodiment.

Shipment Record Database 122 Depicts the shipment record database that communicates with the following elements, shipment event data receiver 104, container cluster 107 services 108-112, edit SmartPass docs 116, update SmartPass 120, according to an example embodiment.

Container Orchestration Deployment Platform 124 Depicts the deployment of the container cluster 107 from the finite state machine application deployer 126 using a container platform according to an example embodiment.

FSM App Node Deployer 126 Depicts the resulting finite state machine application deployer using the rule set development tools 128 according to an example embodiment.

Rule Set Development Tools 128 Depicts the use of rules to develop a state transition matrix 103 that will be deployed in the finite state machine application deployer 126 according to an example embodiment. According to an example embodiment, the rule set may pre-determine a range of states through which the state machine may pass, and may include a range of rules and events/actions through which the process may move from state to state.

State Transition Matrix States 130-144 Depict the resulting finite state machine created using the rule set development tools 128 composed of the states, start SmartPass 130, in transit 132, ready for customs 134, at customs 136, rejected 138, released 140, on hold 142, and completed SmartPass 144, according to an example embodiment.

Figure 2:
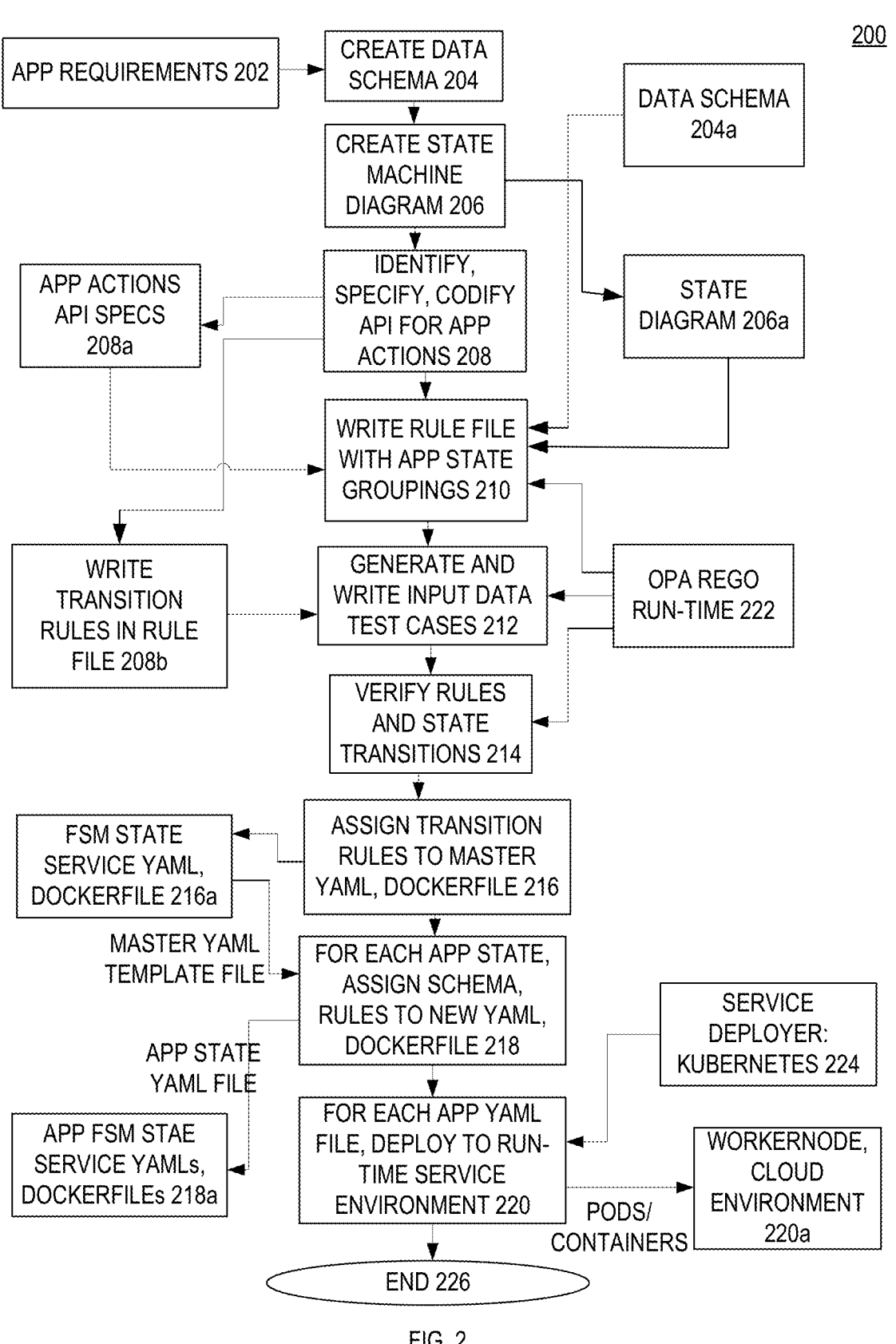
FIG. 2 is a logical flow diagram showing a process for software development and testing for the FSM and Rule Set and deploying them to an App Node Service, according to an example embodiment.

FIG. 2 is a logical flow diagram 200 showing a process for software development and testing for the FSM and Rule Set and deploying them to an App Node Service, according to an example embodiment, discussed further below.

App Requirements 202 Depict the specific application requirements to develop a data schema 204, from 202, flow diagram 200 may continue with 204 according to an example embodiment.

Data Schema Creation 204 Depict the process of creating the data schema 204a using the application requirements 202, from 204, flow diagram 200 may continue with 206, according to an example embodiment.

Data Schema 204a Depict the data schema that will be used to write the rule file with app state grouping 210, according to an example embodiment.

State Machine Diagram Creation 206 Depict the process of creating the state diagram 206a, that will be used to write the rule file with app state grouping 210, from 206, flow diagram 200 may continue with 208, according to an example embodiment.

State Diagram 206a Depict the state diagram that will be used to write the rule file with app state grouping 210, according to an example embodiment.

Identification, Specification, and Codification of API for Application Actions 208 Depict the creation of the application actions and application program interface specifications 208a that will be used to write the rule file with app state grouping 210, while also writing the transition rules in the rule file 208b that will be used to generate and write input data test cases 212, from 208, flow diagram 200 may continue with 210, according to an example embodiment.

Application Action API Specifications 208a Depict the application actions and application program interface specifications that will be used to write the rule file with app state grouping 210, according to an example embodiment.

Writing of Transition Rules in Rule File 208b Depict the writing of the transition rules in the rule file that will be used to generate and write input data test cases 212, according to an example embodiment.

Write Rule File with Application State Groupings 210 Depict the writing of the rule file with application state groupings, from 210, flow diagram 200 may continue with 212, according to an example embodiment.

Generation and Writing of Input Data Test Cases 212 Depict the generating and writing of the input data test cases using the transition rules from the rules file, from 212, flow diagram 200 may continue with 214, according to an example embodiment.

Verification of Rules and State Transitions 214 Depict the process of verification of the generated rules and state transitions, from 214, flow diagram 200 may continue with 216 according to an example embodiment.

Assignment of Transition Rules to Master YAML, Dockerfile 216 Depict the process of assigning the transition rules to the master YAML, Dockerfile for the creation of the fsm_state_service YAML, Dockerfile 216a, from 216, flow diagram 200 may continue with 218, according to an example embodiment.

fsm_state_service YAML, Dockerfiles 216a Depict the file created when assigning transition rules to master YAML, Dockerfile, to be used for assigning schema and rules to each application state, according to an example embodiment.

For each Application State, assign schema, rules to new YAML, Dockerfile 218 Depicts the process of assigning schema and rules to each application state, using the fsm-_state_service YAML, Dockerfile 216a, to create the application fsm_state_service YAMLs, Dockerfiles 218a, from 218, flow diagram 200 may continue with 220, according to an example embodiment.

App fsm_state_service YAMLs, Dockerfiles 218a Depict multiple application YAMLs, Dockerfiles, that each depict a specific application state, according to an example embodiment.

For each App YAML file, deploy to run-time service environment 220 Depict the process of deploying each of the application YAML files 218a in a run-time service environment 220a, from 220, flow diagram 200 may continue with 226, according to an example embodiment.

WorkerNode, Cloud Environment 220a Depict the location of where the applications are deployed, according to an example embodiment.

Open Policy Agent (OPA) Rego Run-time 222 Depict the computation of run-time of specific processes, according to an example embodiment.

Service Deployer: Kubernetes 224 Depicts the software used for deploying the application YAML files, according to an example embodiment.

End 226 Depicts the ending of the process as described in FIG. 2, according to an example embodiment.

FIG. 3 provides an illustration 300 for the structure of a file saved with the Rules and organized by the App States of an FSM, according to an example embodiment, discussed further below.

App State Rules (1 through N) 302-306 Depicts the resulting application state rules as expressed in the rule expression format 302a according to an example embodiment.

Rule Expression Format 302a Depicts an example of the format of the rules used to create the application state rules for the application states 1-n according to an example embodiment.

FIG. 4 shows a block diagram 400 for an Asset State Engine, according to an example embodiment, discussed further below.

Asset State Engine 402 Depicts the flow of the event data feed into the event data input layer 404 and the eventual resulting action event generator 416 according to an example embodiment.

Event Data Input Layer 404 Depicts the feeding of event data in the asset state engine 402 and is taken and is sent to the rule execution engine 410 according to an example embodiment.

SmartPass Record 406 Depicts the inter-changeable SmartPass record in the asset state engine 402 that is used by the rule execution engine 410 according to an example embodiment.

SmartPass State Rules 408 Depicts the inter-changeable SmartPass state rules in the asset state engine 402 that is used by the rule execution engine 410 according to an example embodiment.

Rule Engine Execution 410 Depicts the execution of the SmartPass state rules 408, on the event data input layer 404, with the SmartPass record 406, resulting in the data output layer 412 and the action output layer 414 according to an example embodiment.

Data Output Layer 412 Depicts the output data from the rule engine execution 410 that is used in the action event generator 416 according to an example embodiment.

Action Output Layer 414 Depicts the action output from the rule engine execution 410 that is used in the action event generator 416 according to an example embodiment.

Action Event Generator 416 Depicts the generation of the action event of the asset state engine 402 according to an example embodiment.

After State Processor 418 Depicts the processing after the generation of the action event 418 according to an example embodiment.

FIG. 5 is a block representation 500 showing on the left side, the Rule Sets, 504 through 516 assigned for each SmartPass FSM state with some of these Rule Sets assigned to different Asset State Engines 502*a*, 502*b*, . . . , 502*n*, collectively referred to as 502 on the right side of the diagram, according to an example embodiment, discussed further below Asset State Engines 502*a*-502*n* Asset State Engine 502*a* depicts an example asset state engine implementing Ruleset 504 start SmartPass rules and Ruleset 516 SmartPass state transition rules; Asset State Engine 502*b* depicts an example asset state engine implementing Ruleset 506 in transit rules and Ruleset 516 SmartPass state transition rules; Asset State Engine 502*n* depicts an example asset state engine implementing Ruleset 514 completed SmartPass rules and Ruleset 516 SmartPass state transition rules.

Rulesets 504-516 Referring to FIG. 5, Diagram 500 illustrates, Ruleset 504 that depicts the start SmartPass rules; Ruleset 506 that depicts the in transit rules; Ruleset 508 that depicts the ready for customs rules; Ruleset 510 that depicts the at customs rules; Ruleset 512 that depicts the released rules; Ruleset 514 that depicts the completed SmartPass rules; Ruleset 516 that depicts the SmartPass state transition rules.

According to an example embodiment, the rule set may pre-determine a range of states through which the state machine may pass, and may include a range of rules and events/actions through which the process may move from state to state. FIG. 6 depicts an example embodiment of an example component level example hardware architecture 600 for an example computing device as may be used for any of various example hardware subsystem components of an example system, according to one example embodiment, discussed further below.

FIG. 7 depicts an example embodiment illustrating an example system level hardware architecture 700 for an example application server, web server embodiment of an example service provider system for providing an example software architecture of various example subsystem components of an example networking system, which may be used to implement, according to one example embodiment, discussed further below.

The logical flow diagram in FIG. 2 may be for software development and testing for the FSM and Rule Set and deploying them to an App Node Service, according to an example embodiment. The App Node Service may be deployed as a run-time software Container executing in the Container Cluster managed by a cluster software environment such as Kubernetes, available from kubernetes.io, and available from the Linux Foundation, according to an example embodiment. This corresponds to the components in FIG. 1 that illustrates in the left side of the diagram the components for the Rule Set Development Tools 128, FSM App Node Deployer 126, Container Orchestration Deployment Platform 124 and the Container Cluster 140, according to an example embodiment.

Starting with the data processing requirements for an Application 202 in FIG. 2, a data schema 204*a* may be created 204 for the data contents, structure(s), and data structure relationships, according to an example embodiment. Also, to fulfill the data flow and logic requirements for the data processing, a State Machine diagram 206*a* may be designed and created 206, according to an example embodiment. This diagram provides the notation and description for each flow state for the data, state transitions, and decision points for transitions, according to an example embodiment. The State Machine diagram may be converted and encoded 208 as rule expressions that may be saved to a file 208*b*, according to an example embodiment. The rule expressions may be grouped 210 by each state corresponding to states identified in the State Machine, according to an example embodiment. These groupings can be codified and segregated into different sections of the same file, according to an example embodiment.

The user identifies the Application Actions Services that may be available in the computing environment and documents this as an Action Service specification, according to an example embodiment. These specifications include URL and API calls, security access and permissions, e.g., Role-Based Access Controls (RBAC), and network connections, according to an example embodiment. In FIG. 1, these Action Services may be located on the far right of the diagram including a subset for the SmartPass processing:

08. Edit SmartPass Docs Service 116

09. Enable Doc Upload Service 118

10. Update SmartPass Service. 120

Using the Rule Development Tools 128, shown in the lower left side of FIG. 1, the user writes the code for the application business rules including the inclusion or references in the Data Schema, the State Diagram encoded rules and groupings, and Action Service specifications, according to an example embodiment. The business rules may be saved and tested in a controlled environment or sandbox environment such as the OPA Rego Playground or a similar private test environment, according to an example embodiment.

FIG. 3 provides an illustration for the structure of a file saved 302*a* with the Rules and organized by the App States 302-306 of an FSM, according to an example embodiment. Each separated App State block in the diagram that contains its rules, definitions, and settings that will be assigned to a processor in a Node App Service called the Asset State Engine 402 shown in FIG. 4, according to an example embodiment. The details for this may be provided in the section "Asset State Engine for Processing the Rules", according to an example embodiment.

After the business rules and the state transition logic may be verified for example, through using the sandbox environment, the Rule Set Development Tools 128 may be used to generate the State Transition Matrix (STM) 103 that contains the Rule Set for FSM state changes and the unique identifiers or keys for each FSM state that will be deployed in an App Node Service 126 in the Container Cluster 140, according to an example embodiment. The STM may be assigned to a deployment specification called a YAML file, according to an example embodiment.

As will be apparent to those skilled in the relevant art, YAML is a human-readable data serialization language that is often used for writing configuration files, see yaml.org for further information.

In FIG. 1, this may be performed in the FSM App Node Deployer, according to an example embodiment. A YAML may be a dual-purpose document that may be text: 1) in human readable form and 2) the same text may be a data serialization standard interpreted by a digital data reader to convert the text to any one of the major programming languages, according to an example embodiment. Because the STM may be common among all the App Node Services, the STM specifics may be to be included in all the FSM state YAML deployment descriptors, according to an example embodiment.

In FIG. 2, in the process block "For each App YAML file, deploy to run-time service environment," the App Node Service YAML may be automatically code generated based on a template YAML form designed specifically for App Node Services, according to an example embodiment. The template design may be based on the premise that YAML files differ in their Rule Set contents and their unique FSM state names that may be also the unique designation for the type of service, according to an example embodiment. In FIG. 1, the cluster service, may be identified as the Container Cluster 140 manager and processor that can be deployed as the product called Kubernetes, according to an example embodiment. The FSM App Node Deployer 126 interacts with the cluster service APIs at both the Master and Worker Nodes levels for installing and initializing each FSM state-based App Node service, according to an example embodiment.

Asset State Engine for Processing the Rules

The block diagram for the Asset State Engine in FIG. 4 may be the core processor for the App Node Service, according to an example embodiment. The YAML deployment file described earlier includes the build text description for this Engine, according to an example embodiment. The Record and the SmartPass Rules may be the components that differ between all running App Node Services, according to an example embodiment. This may be shown in FIG. 4 as the grayed-out boxes, according to an example embodiment. The SmartPass Record 406 may be retrieved based on the id contents of the Transaction Event, according to an example embodiment. The SmartPass State Rules 408 may be specified in the YAML deployment file and the Rule Set may be assigned during the construction and initialization of the App Node Service, according to an example embodiment. Each part of the Asset State Engine may be described as follows, according to an example embodiment.

Event Data Input Layer: 404 API for receiving event data corresponding to the Asset Record and for rule set evaluation, according to an example embodiment.

Asset or SmartPass Record: 406 data record stored in the App Asset Database, Shipment Record Database for the SmartPass, that may be subject to the FSM evaluations, according to an example embodiment.

Asset or SmartPass State Rules: 408 Executable code written in rule format that evaluates the combined data set of the Asset Record and received event data, according to an example embodiment.

Rules Engine Execution: 410 Performs the rule computations and evaluations on the combined data set of the Asset Record and received event data and provides resulting data and prescribed actions, according to an example embodiment.

Data Output Layer: 412 Shared memory area for the resulting Rule Engine data, according to an example embodiment.

Action Output Layer: 414 Shared memory area for the resulting Rule Engine prescribed actions, according to an example embodiment.

Action Event Generator: 416 Combines the Data Output Layer and the Action Output Layers into a Transaction Event that may be fed to the Action Queue for follow-on downstream processing, according to an example embodiment.

The After State Processor 418 may be a common software module for all App Node Services that belong to the same FSM deployment, according to an example embodiment. This was described earlier and contains the STM, State Transition Matrix 103, according to an example embodiment. This may be used to compute the State change for the Asset or SmartPass Record as the most recent transaction in the App Node Service, according to an example embodiment.

FIG. 5 provides an illustration of a block representation 500 on the left side as that of the Rule Sets assigned for each SmartPass FSM state with some of these Rule Sets 504-516 assigned to different Asset State Engines 502 on the right side of the diagram, according to an example embodiment. This may be to show that each Asset State Engine 502 may be independent from one another, according to an example embodiment. It also shows that most of the software modules installed in the Asset State Engines 502 are re-used from the repository of Rules Sets 504-516 on the left side, according to an example embodiment. By swapping out (illustrated by arrows from the left column to the right column) the SmartPass State Rules within an Asset State Engine 502, the processing and rule executions may be uniquely different from other Asset State Engines 502 with different State Rules assignments, according to an example embodiment.

Running Two or More FSM Applications

The App Node Service and the Asset State Engine 402 can be used to process multiple, different FSM deployments in any Container Cluster 140, according to an example embodiment. Because of the unique State name and State Type Name assignments, Independent FSMs, 2 or more, all co-located in the same Container Cluster may be isolated from other FSMs, do not conflict, and message transactions operating in one FSM may be isolated from all other FSMs, according to an example embodiment. This may be accomplished by a layered design approach that involves implementing separate process namespace assignments at the Container level, different Container networks, and symmetric and asymmetric message encryption within each FSM container, according to an example embodiment.

Updating a Rule Set for One or a Few App Node Services

The methods described have been for creating and deploying newly created and deployed FSM state-based Rules and App Node Services in a cluster environment, with managed containers, e.g., Kubernetes, according to an example embodiment. To install a change to the Rule Set of a running App Node Service, a new App Node Service with a new Asset State Engine instance and the updated Rule Set may be created and executed in the Container Cluster 140, according to an example embodiment. This new App Node Service executes alongside the older version with no interaction between them in the same environment, according to an example embodiment. With both versions running at the same time, other services that use these can interact with the new version and some may still require engaging with the old version, according to an example embodiment.

As Events arrive at the Event Data Receiver and may be queued at the Shipment Event Queue, the Shipment Event Queue can be assigned to route its queued Events to the new App Node Service, according to an example embodiment. The other App Node Services of the FSM may be unchanged and unaffected when the update may be applied, according to an example embodiment.

FIG. 6 depicts an example embodiment of a hardware architecture block diagram 600 for an example computing or communications device as may be used for any of various example buyer devices, example seller devices, example financial institution devices, example nonfungible token (NFT) devices, notification and/or authentication devices, example state machines, example shipment arrived state machine, example at customs state machine, example pay tax fees computing device, example shipment cleared computing device, example cargo departed port for in country file paperwork state machine event processor, example source device, example shipment event data receiver, example shipment event queue, example start SmartPass, example shipment in transit service, example shipment ready for customs service, example shipment action queue, example edit SmartPass Docs service, example enable doc upload service, example update SmartPass service, example shipment record database state machine, example rule engine, example rule repository, example rule editor, example engine execution core, example reporting subsystem, example SmartPass state diagram execution processors, state machines, example event data feeds, event data input layer devices, SmartPass record devices, Asset state engine devices, SmartPass State rules, rule engine execution, data output layer and action output layer devices, action event generators, after state processors, flow diagram execution processors, example state machine devices, flow diagram elements, state engines, event receiver devices, source devices, asset state devices, event queue devices, action queue devices, app asset state databases and/or services, FSM framework components, SmartHub devices, cryptocurrency exchange devices, as well as example computing devices of users, mobile devices, network communication components, routers, gateways, etc., according to an example embodiment of the present invention.

FIG. 6 depicts an exemplary schematic block diagram 600 illustrating an exemplary computer/communications device hardware architecture as may be used in various exemplary components of an exemplary embodiment including user devices various example buyer devices, example seller devices, example financial institution devices, example nonfungible token (NFT) devices, notification and/or authentication devices, example SmartHub devices, cryptocurrency exchange devices, as well as example computing devices of users, mobile devices, network communication components, routers, gateways, etc., computer device(s), bank devices, merchant devices, payment service provider devices, other computing or communications devices, routers, application servers, web servers, cloud-based computing devices, communication devices, switches, routers, gateways, telephone devices, mobile devices, content servers, web servers, database servers and/or other application servers, end-user devices, operations center devices, client and/or server devices, network routers, gateways, access points, and the like, according to various exemplary embodiments.

FIG. 6 depicts an exemplary schematic block diagram 600 illustrating an exemplary computer/communications device hardware architecture as may be used in various exemplary components of an exemplary embodiment including mobile devices, wearables, cloud-based computing devices, content servers, web servers, database servers and/or other application servers, according to various exemplary embodiments. Diagram 600 may include any of various exemplary computer systems as may be used as an external computer device, an internal and/or STB or SOC, a mobile device, a wearable, a client, or server, web server, application server, and/or any other of the computing devices included in the other drawings, according to various exemplary embodiments. FIG. 6 depicts an exemplary diagram 600 illustrating an exemplary computer/communications device hardware architecture as may be used in various components of exemplary embodiments of the present invention. FIG. 6 depicts an exemplary view 600 of exemplary computer systems such as those represented in FIGS. 1-6, 7, etc., including devices which may execute various modules, including components, systems, devices, computers, processors, mobile devices, routers, gateways, network devices, other computing and/or network devices, network monitoring and security operations data analysis computing devices which may execute various operating system and software components on such computing devices and/or subsystem devices and hardware/software modules as may be represented by devices implied by, or perform steps illustrated in various flowchart diagrams as illustrated in the figures by elements 101-113, 201-205, 600, 700, etc., as may be used in implementing an exemplary embodiment of the present invention. FIG. 6 depicts an exemplary embodiment of a computer system that may be used in computing devices including those shown and not shown, such as, e.g., but not limited to, service provider computing devices, SmartHub systems, buyer computing devices, supplier computing devices, digital financial services computing devices, public blockchain for proxy NFT computing devices, data repository processing and/or storage computing devices, network devices, communication devices, authentication devices, notification devices, requesting devices, response devices, cryptocurrency exchange related devices, NFT related devices, traditional financial services and/or fiat currency processing computing devices, electronic funds transfer (EFT) related devices, network monitoring and analysis devices of example operations illustrated example environment 700, computing devices 600, devices, servers, application servers, web servers, other wearable and/or mobile devices, sensor capture devices, routers, gateways, data network communication equipment, etc., according to an exemplary embodiment of the present invention. FIG. 6 depicts an exemplary embodiment of a computer system that may be used as client device, a server device (not shown), a network component, router, packet monitor/analyzer, server device, storage, and/or cloud based storage device, application servers, and/or web servers, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 600 is shown in FIG. 6, depicting an exemplary embodiment of a block diagram of an exemplary computer system useful for implementing the present invention. Specifically, FIG. 6 illustrates an example computer 600, which in an exemplary embodiment may be, e.g., (but not limited to) a personal computer (PC) system running an operating system such as, e.g., (but not limited to) WIN- DOWS MOBILE™ for POCKET PC, or MICROSOFT® WINDOWS® NT/98/2000/XP/CE/7/8/10, etc. available from MICROSOFT® Corporation of Redmond, Wash, U.S.A., SOLARIS® from SUN® Microsystems of Santa Clara, Calif, U.S.A, OS/2 from IBM® Corporation of Armonk, N.Y, U.S.A, Mac/OS, Mac OSX, iOS, from APPLE® Corporation of Cupertino, Calif, U.S.A., etc., or any of various versions of UNIX® (a trademark of the Open Group of San Francisco, Calif, USA) including, e.g., LINUX®, UBUNTU, HPUX®, IBM AIX®, and SCO/ UNIX®, etc., ANDROID, Android OS is available from Google, JAVA from Oracle, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 600 is shown in FIG. 6. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, a tablet, a phone, a mobile phone, a cellular phone, a communications device, an iPhone, iOS, a smartphone, an iPad, a tablet based device, an ANDROID OS device, an iOS device, a Symbian based device, a Windows 8, 10, 11, etc., device, etc., may also be implemented using a computer such as that shown in FIG. 6.

The computer system 600 may include one or more processors, such as, e.g., but not limited to, processor(s) 604, which may include microprocessors, coprocessors, nanoprocessors, microcontrollers, systems on a chip (SOC), multiprocessor systems, parallel processors, CISC type processors, RISC type processors, POWER type processors, ARM-architecture processors, massively parallel processor, graphic processors (GPUs) 632, cryptographic processors such as, e.g., but not limited to, encryption/decryption processor 636, quantum computers, etc. The processor(s) 604 may be connected to a communication infrastructure 606 (e.g., but not limited to, a communications bus, crossover bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 600 may include a display interface 602 that may forward, e.g., but not limited to, graphics, text, and other data, etc., from the communication infrastructure 606 (or from a frame buffer, etc., not shown) for display on the display unit 630, and/or GPU 632, and/or touchscreen 634, and/or other input or output, and/or input and output device, sensor-based device, etc.

The computer system 600 may also include, e.g., but may not be limited to, a main memory 608, random access memory (RAM), and a secondary memory 610, etc. The secondary memory 610 may include, for example, (but not limited to) a hard disk drive 612 and/or a removable storage drive 614, representing a floppy diskette drive, a magnetic tape drive, an optical disk drive, a compact disk drive CD-ROM, DVD, Personal Cloud storage, redundant array of inexpensive disks (RAID) array, etc. The removable storage drive 614 may, e.g., but not limited to, read from and/or write to a removable storage unit 618 in a well-known manner. Removable storage unit 618, also called a program storage device or a computer program product, may represent, e.g., but not limited to, a floppy disk, magnetic tape, optical disk, compact disk, etc. which may be read from and written to by removable storage drive 614. As will be appreciated, the removable storage unit 618 may include a computer usable storage medium having stored therein computer software and/or data.

In alternative exemplary embodiments, secondary memory 610 may include other similar devices for allowing computer programs or other instructions to be loaded into computer system 600. Such devices may include, for example, but not limited to, a removable storage unit 622 and an interface 620. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, FLASH memory, application specific integrated circuits (ASICs), field programmable gate arrays (FPGAs), and/or other removable storage units 622 and interfaces 620, which may allow software and/or data to be transferred from the removable storage unit 622 to computer system 600.

The computing device 600 may also include a cloud-accessible or cloud-based processing and/or storage solution as may be available from Amazon Web Services available from Amazon of Seattle, WA USA, or Azure cloud available from Microsoft Corporation of Redmond, WA USA, or Google Cloud Service available from Google of Alphabet Corporation, Mountain View, CA USA, among many other network and software communications offerings available from IBM Corporation, Oracle Corporation, and others.

Computer 600 may also include an input device such as, e.g., (but not limited to) a mouse or other pointing device such as a digitizer, touch-based sensor, and/or a keyboard and/or other data entry device (none of which are labeled).

Computer 600 may also include output devices, such as, e.g., (but not limited to) display 630, and display interface 602. Computer 600 may include input/output (I/O) devices such as, e.g., (but not limited to) communications interface 624, cable 628 and communications path 626, etc. These devices may include, e.g., but not limited to, a network interface card, and modems (neither are labeled). Communications interface 624 may allow software and data to be transferred between computer system 600 and external devices. Examples of communications interface 624 may include, e.g., but may not be limited to, a modem, a network interface (such as, e.g., an Ethernet card), a communications port, a Personal Computer Memory Card International Association (PCMCIA) slot and card, etc. Software and data transferred via communications interface 624 may be in the form of signals 628 which may be electronic, electromagnetic, optical or other signals capable of being received by communications interface 624. These signals 628 may be provided to communications interface 624 via, e.g., but not limited to, a communications path 626 (e.g., but not limited to, a channel). This channel 626 may carry signals 628, which may include, e.g., but not limited to, propagated signals, which may be stored in nontransitory form, and may be implemented using, e.g., but not limited to, wire or cable, local and/or wide area network (LAN/WAN) protocols, Ethernet, Token Ring, FDDI, carried over andy of various physical media, fiber optics, a telephone line, twisted pair, shielded twisted pair, a cellular link, a radio frequency (RF)

link, wireless communications, spread spectrum, orthogonal frequency division multiplexing (OFDM), and/or other communications channels, etc.

In this document, the terms "computer program medium" and "computer readable medium" may be used to generally refer to media such as, e.g., but not limited to removable storage drive 614, a hard disk installed in hard disk drive 612, and signals 628, etc. These computer program products may provide software to computer system 600. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may may include one or more processors.

Embodiments of the present invention may include apparatuses for performing the operations herein. An apparatus may be specially constructed for the desired purposes, or it may may include a general purpose device modified as set forth herein to perform the processing as described to be selectively activated or reconfigured by a software program stored in the device to become a special purpose device capable of performing the subsystem's or submodule's performance functionality and computer and communications systems instructions, and/or by hardware processing such as, e.g., but not limited to, performing certain trusted platform system processing, including exemplary key based encryption/decryption, network monitoring, packet inspection and the like, according to exemplary embodiments.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.) when nontransitory, and others.

Computer programs (also called computer control logic), may include object-oriented computer programs, and may be stored in main memory 608 and/or the secondary memory 610 and/or removable storage units 614, also called computer program products. Such computer programs, when executed, may enable the computer system 600 to perform the features of the present invention as discussed herein. In particular, the computer programs, when executed, may enable the processor 604 to provide a method to resolve conflicts during data synchronization according to an exemplary embodiment of the present invention. Accordingly, such computer programs may represent controllers of the computer system 600.

Various artificial intelligence based analysis techniques may be used herein including neural networks, machine learning, any of various well-known AI and ML techniques and processes (e.g., reinforcement learning, dynamic programming, state action reward state action (SARSA), q learning, supervised learning, unsupervised learning, large language models (LLMs), natural language search and interactive request and response, neural networks, convolutional neural networks, statistical heuristics, topic identification and classification, linguistics and semantic processing, tensorflow and openAI libraries, cloud computing services, specific APIs, Microsoft cognitive services, Google cloud AI, Watson AI, offerings from Amazon, Facebook, Baidu, Apple, and others, etc.), and output of such algorithms may be analyzed further as set forth herein to obtain feature vectors and other data which may be used to provide further guidance to users, and/or be integrated for further processing and analysis, authentication, access control, and/or encryption/decryption processing, and coupled via decision support systems, executive information systems, and other graphical user interface enabled network and cyber security monitoring and threat analysis management and processing.

In another exemplary embodiment, the invention may be directed to a computer program product may include a computer readable medium having control logic (computer software) stored therein. The control logic, when executed by the processor 604, may cause the processor 604 to perform the functions of the invention as described herein. In another exemplary embodiment where the invention may be implemented using software, the software may be stored in a computer program product and loaded into computer system 600 using, e.g., but not limited to, removable storage drive 614, hard drive 612 or communications interface 624, etc. The control logic (software), when executed by the processor 604, may cause the processor 604 to perform the functions of the invention as described herein. The computer software may run as a standalone software application program running atop an operating system or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

According to an exemplary embodiment, the application system can include an electronic decision support system (DSS) (not shown), policy-based trust platform systems, which can interact, e.g., but not limited to, with computer database management system (DBMS) 607, and/or electronic interactive, graphical user interface (GUI) system. Each of the exemplary DSS, DBMS and/or EIGUI system, can then, using e.g., but not limited to, a cryptographic processor and/or a crypto chip controller processor 636, or the like, can then encrypt the data using electronic encryptor, which can make use of one or more cryptographic algorithm electronic logic, which can include encryption code, a cryptographic combiner, etc., and may be stored in encrypted form, according to an exemplary embodiment, in a computer database storage facility, from computer database storage device, and from there the process can continue with use of the cryptographic algorithm electronic logic, and electronic decryptor, which can decrypt and/or provide a process for decrypting encrypted data, and/or by providing such data to the DSS, the DBMS, or the EIGUI, if authorized. By using encryption/decryption, certain algorithms can be used, as described herein, including, e.g., but not limited to, checksum, AES encryption, RSA, PKI, TLS, FTPS, SFTP, etc. and/or other cryptographic algorithms and/or protocols, according to exemplary embodiments.

Cryptographic Functions

Cryptographic systems, according to an exemplary embodiment, can provide one or more of the following four example services. It is important to distinguish between these, as some algorithms are more suited to particular tasks, but not to others. To protect patient data, personal data can be encrypted prior to storage and can be decrypted before accessing the data, according to an exemplary embodiment. When analyzing requirements and risks, one needs to decide which of the four functions should be used to protect the proprietary data, according to an exemplary embodiment.

Authentication

Using a cryptographic system, according to an exemplary embodiment, one can establish the identity of a remote user (or system). A typical example is the SSL certificate of a web server providing proof to the user device that user device is connected to the correct server, according to an exemplary embodiment.

The identity is not of the user, but of the cryptographic key of the user. Having a less secure key lowers the trust one can place on the identity, according to an exemplary embodiment.

Non-Repudiation

The concept of non-repudiation is particularly important for financial or e-commerce applications, according to an exemplary embodiment. Often, cryptographic tools are required to prove that a unique user has made a transaction request, according to an exemplary embodiment. It must not be possible for the user to refute his or her actions, according to an exemplary embodiment.

For example, a customer can request a transfer of money from her account to be paid to another account, according to an exemplary embodiment. Later, she claims never to have made the request and demands the money be refunded to the account. If one has non-repudiation through cryptography, one can prove-usually through digitally signing the transaction request, that the user authorized the transaction.

Confidentiality

More commonly, the biggest concern can be to keep information private, according to an exemplary embodiment. Cryptographic systems, according to an exemplary embodiment, have been developed to function in this capacity. Whether it be passwords sent during a log on process, or storing confidential proprietary financial data in a database, encryption can assure that only users who have access to the appropriate key can get access to the proprietary data.

Integrity

One can use cryptography, according to an exemplary embodiment, to provide a means to ensure data is not viewed or altered during storage or transmission. Cryptographic hashes for example, can safeguard data by providing a secure checksum, according to an exemplary embodiment.

Cryptographic Algorithms

Various types of cryptographic systems exist that have different strengths and weaknesses, according to an exemplary embodiment. Typically, the exemplary cryptographic systems can be divided into two classes; 1) those that are strong, but slow to run, and 2) those that are quick, but less secure. Most often a combination of the two approaches can be used, according to an exemplary embodiment (e.g.: secure socket layer (SSL)), whereby we establish the connection with a secure algorithm, and then if successful, encrypt the actual transmission with the weaker, but much faster algorithm.

Symmetric Cryptography

Symmetric Cryptography, according to an exemplary embodiment, is the most traditional form of cryptography. In a symmetric cryptosystem, the involved parties share a common secret (password, pass phrase, or key), according to an exemplary embodiment. Data can be encrypted and decrypted using the same key, according to an exemplary embodiment. These symmetric cryptography algorithms tend to be comparatively fast, but the algorithms cannot be used unless the involved parties have already exchanged keys, according to an exemplary embodiment. Any party possessing a specific key can create encrypted messages using that key as well as decrypt any messages encrypted with the key, according to an exemplary embodiment. In systems involving a number of users who each need to set up independent, secure communication channels, symmetric cryptosystems can have practical limitations due to the requirement to securely distribute and manage large numbers of keys, according to an exemplary embodiment.

Common examples of symmetric algorithms include, e.g., but not limited to, DES, 3DES and/or AES, etc. The 56-bit keys used in DES are short enough to be easily brute-forced by modern hardware and DES should no longer be used, according to an exemplary embodiment. Triple DES (or 3DES) uses the same algorithm, applied three times with different keys giving it an effective key length of 128 bits, according to an exemplary embodiment. Due to the problems using the DES algorithm, the United States National Institute of Standards and Technology (NIST) hosted a selection process for a new algorithm. The winning algorithm was Rijndael and the associated cryptosystem is now known as the Advanced Encryption Standard or AES, according to an exemplary embodiment. For most applications 3DES, according to an exemplary embodiment, is acceptably secure at the current time, but for most new applications it is advisable to use AES, according to an exemplary embodiment.

Asymmetric Cryptography (Also Called Public/Private Key Cryptography)

Asymmetric algorithms, according to an exemplary embodiment, use two keys, one to encrypt the data, and either key to decrypt. These inter-dependent keys are generated together, according to an exemplary embodiment. One key is labeled the Public key and is distributed freely, according to an exemplary embodiment. The other key is labeled the Private Key and must be kept hidden, according to an exemplary embodiment. Often referred to as Public/ Private Key Cryptography, these cryptosystems can provide a number of different functions depending on how they are used, according to an exemplary embodiment.

The most common usage of asymmetric cryptography is to send messages with a guarantee of confidentiality, according to an exemplary embodiment. If User A wanted to send a message to User B, User A would get access to User B's publicly available Public Key, according to an exemplary embodiment. The message is then encrypted with this key and sent to User B, according to an exemplary embodiment. Because of the cryptosystem's property that messages encoded with the Public Key of User B can only be decrypted with User B's Private Key, only User B can read the message, according to an exemplary embodiment.

Another usage scenario is one where User A wants to send User B a message and wants User B to have a guarantee that the message was sent by User A, according to an exemplary embodiment. In order to accomplish this, User A can encrypt the message with their Private Key, according to an exemplary embodiment. The message can then only be decrypted using User A's Public Key, according to an exemplary embodiment. This can guarantee that User A created the message because User A is then the only entity who had access to the Private Key required to create a message that can be decrypted by User A's Public Key, according to an exemplary embodiment. This is essentially a digital signature guaranteeing that the message was created by User A, according to an exemplary embodiment.

A Certificate Authority (CA), whose public certificates are installed with browsers or otherwise commonly available, may also digitally sign public keys or certificates, according to an exemplary embodiment. One can authenticate remote systems or users via a mutual trust of an issuing CA, according to an exemplary embodiment. One can trust their 'root' certificates, according to an exemplary embodiment, which in turn authenticates the public certificate presented by the server.

PGP and SSL are prime examples of systems implementing asymmetric cryptography, using RSA and/or other algorithms, according to an exemplary embodiment.

Hashes

Hash functions, according to an exemplary embodiment, take some data of an arbitrary length (and possibly a key or password) and generate a fixed-length hash based on this input. Hash functions used in cryptography have the property that it can be easy to calculate the hash, but difficult or impossible to re-generate the original input if only the hash value is known, according to an exemplary embodiment. In addition, hash functions useful for cryptography have the property that it is difficult to craft an initial input such that the hash will match a specific desired value, according to an exemplary embodiment.

MD5 and SHA-1 are common hashing algorithms, according to an exemplary embodiment. These algorithms are considered weak and are likely to be replaced in due time after a process similar to the AES selection, according to an exemplary embodiment. New applications should consider using SHA-256 instead of these weaker algorithms, according to an exemplary embodiment.

Key Exchange Algorithms

There are also key exchange algorithms (such as Diffie-Hellman for SSL), according to an exemplary embodiment. These key exchange algorithms can allow use to safely exchange encryption keys with an unknown party, according to an exemplary embodiment.

Algorithm Selection

As modern cryptography relies on being computationally expensive to break, according to an exemplary embodiment, specific standards can be set for key sizes that can provide assurance that with today's technology and understanding, it will take too long to decrypt a message by attempting all possible keys, according to an exemplary embodiment.

Therefore, we need to ensure that both the algorithm and the key size are taken into account when selecting an algorithm, according to an exemplary embodiment.

FIG. 7 depicts an example application server and web server network architecture including an example fully meshed, redundant communications network load balancing application server architecture as may be used for an example SmartHub system service provider and/or a digital financial services and/or payment service provider, and may couple client devices such as, e.g., but not limited to, service provider, buyer devices, supplier devices, public blockchain, proxy NFT systems, data repository systems, authentication systems, ledger tracking systems, blockchain distributed ledge systems, NFT systems, SmartPass NFT authentication systems, notification systems, request response systems, financing request systems, collateralized NFT request response systems, etc. to example service devices using an example network infrastructure, according to an example embodiment of the present invention. FIG. 7 depicts an exemplary schematic block diagram 700 illustrating an exemplary communications network device hardware architecture 700 showing exemplary network devices including exemplary application server devices 702, exemplary storage devices 706, web server devices 708, all coupled to an exemplary communications network 704, which may be coupled to other devices such as, e.g., but not limited to, a cyber security network security operations environment device or devices 704, and other end user and other internal and/or external user computing and/or communications devices 710, which may be coupled to the network communications environment 704 by one or more physical devices not shown, such as, e.g., but not limited to, network interface cards (NICs), wireless local area network WLAN or wireless fidelity (WI-FI) (IEEE 802.11 communication technologies), physical wires, twisted pair, coaxial cable, fiber optic cable, and/or other communications network cabling, wireless communication access points and/or wireless antennae, wires, wireless media, routers, gateways, access points, exchange carrier facilities, modulator/demodulator (modems), modulating equipment, cellular network exchange devices, etc. Block diagram 700 may serve as an exemplary logical diagram of associated physical devices. Physical devices may communicate via one or more communications network software protocols via exemplary protocol languages or stacks which may correlate to the Open Systems Interconnect (OSI) stack of communication layers, such as, e.g., but not limited to, Internet Protocol (IP), transmission control protocol (TCP), among various other protocols including, e.g., but not limited to, TCP/IP protocols, UDP, hypertext transfer protocol (HTTP), file transfer protocol (FTP), security protocols (e.g., HTTPS, SFTP, FTPS, TLS, etc.), as will be apparent to those skilled in the relevant art. Various load sharing devices and port sharing devices may be used, as well as protocol tracing and packet tracing devices, which may be able to access such communications data and perform exemplary processing including packet inspection, deep packet inspection, network tracing, packet inspection (e.g., source and destination address, etc.) and the like. Such systems may be used to perform various block chain related distributed ledger technologies so as to replicate data which may be encrypted and decrypted using various algorithms. Certain algorithms may be used which may be resilient to conventional decryption techniques, resilient to brute force attack decryption techniques, and/or may be resilient to quantum computing based decryption techniques. Such software and hardware network analysis and/or processing tools may be used to process communications network traffic internal to, and/or external from an exemplary entity organization and an exemplary network operations center (NOC) network monitoring organization may be able to analyze such network traffic to, e.g., process different types of traffic, using various sophisticated network operations tools and techniques as well as to perform various automated processing as described further herein.

Although example embodiments of the invention are illustrated and described herein as embodied in an example embodiment, the invention should not be limited to the details shown in those example embodiments because various modifications and structural changes may be made without departing from the spirit of the invention while remaining within the scope and range of equivalents of the claims.

The construction and method of operation of various example embodiments of the claimed invention and additional features and/or advantages of various example embodiments of the invention are best understood from the following description of specific example embodiments when read in connection with the accompanying drawings.

Various exemplary embodiments of the invention are discussed in detail herein. While specific exemplary embodiments are discussed herein, it should be understood that this is done for illustration purposes only. A person skilled in the relevant art will recognize that other components and configurations can be used without parting from the spirit and scope of the invention.

What is claimed is:

1. A computer implemented method of codifying data or a program using a rule-based and state-based application program or software component for automatic deployment in a distributed computing environment, comprising at least one electronic computer processor coupled to at least one electronic memory storage device and coupled via at least one communications network interface to at least one data communications network, the method comprising:

electronically programming and electronically assigning, by the at least one electronic computer processor, of production rules as code used for processing data and events for shipment of various cargo at a port through customs processing and finance processing referred to as supply chain financing in the distributed computing environment;

electronically programming, by the at least one electronic computer processor, a finite state machine (FSM) to implement the state-based application program or software component;

electronically deploying, by the at least one electronic computer processor, the FSM comprising:

electronically collecting, by the at least one electronic computer processor, of at least one distributed software app node service;

wherein each of said at least one distributed software app node services comprises:

at least a single state of the FSM; and at least one dynamically loadable programmable rule; and electronically receiving, by the at least one electronic computer processor, at least one shipment data, wherein said at least one shipment data comprises data collected from at least one data source.

2. The method according to claim 1, wherein said at least one data source comprises at least one or more of:

electronic data interchange (EDI), other Enterprise Resource Planning (ERP) messaging, web service application programming interface (API) calls, Internet Of Things (IoT) messaging, remote file copy, or tracking sensors.

3. The method according to claim 1, wherein said at least one shipment data comprises:

electronically aggregating, by the at least one electronic computer processor, said at least one shipment data comprising at least one SmartPass comprising said at least one shipment data combined with said at least one dynamically loadable programmable rule, the FSM, and associated processing actions, wherein said at least one SmartPass comprises electronically dynamically assigning, by the at least one electronic computer processor, said at least one dynamically loadable programmable rule based on at least one or more of:

said at least one shipment data of an individual shipment, or a pre-determined need.

4. The method according to claim 1, wherein the method comprises wherein said electronically deploying the FSM comprises electronically deploying at least one app node service.

5. The method according to claim 1, wherein said at least one app node service comprises a YAML App Node Service, and wherein said deploying comprises at least one or more of:

electronically deploying to a run-time service environment;

wherein said YAML App Node Service comprises being automatically code generated based on a YAML form template design, wherein said YAML form template design is designed specifically for said YAML App Node Service based on a differing Rule Set contents and unique FSM state name;

wherein said YAML App Node Service comprises a cluster service comprising at least one or more of:

a cluster container manager, a processor of at least one cluster service API deployable as a container cluster service, or a KUBERNETES container cluster service; or electronically creating and deploying a newly created and deployed FSM state-based Rules and App Node Services in a cluster environment, with managed KUBERNETES containers;

electronically installing a change to a Rule Set of a running App Node Service, a new App Node Service with a new Asset State Engine instance, and creating an updated Rule Set executed in a Container Cluster;

electronically executing a new App Node Service alongside an older version App Node Service, with no interaction between said App Node Services in the same environment, wherein both said App Node services are executing at the same time, at least one other service using said App Node Services comprise at least one or more of:

electronically interacting with said new App Node Service; or electronically interacting with said old App Node Service.

6. A system of codifying data or a program using a rule-based and state-based application program or software component for automatic deployment in a distributed computing environment, the system comprising:

at least one electronic computer processor, coupled to at least one electronic memory storage device and coupled via at least one communications network interface, coupled to at least one data communications network, the system comprising wherein said at least one electronic computer processor is configured to:

electronically program and assign of production rules as code used for processing data and events for shipment of various cargo at a port through customs processing and finance processing referred to as supply chain financing in the distributed computing environment;

electronically program a finite state machine (FSM) to implement the state-based application program or software component; and electronically deploy the FSM comprising:

electronically collect of at least one distributed software app node service;

wherein each of said at least one distributed software app node services comprises:

at least a single state of the FSM; and at least one dynamically loadable programmable rule; and electronically receive at least one shipment data, wherein said at least one shipment data comprises data collected from at least one data source.

7. The system according to claim 6, wherein said at least one data source comprises at least one or more of:

electronic data interchange (EDI), other Enterprise Resource Planning (ERP) messaging, web service application programming interface (API) calls, Internet Of Things (IoT) messaging, remote file copy, or tracking sensors.

8. The system according to claim 6, wherein said at least one shipment data comprises wherein said at least one electronic computer processor is configured to:

electronically aggregate said at least one shipment data comprising at least one SmartPass comprising said at least one shipment data combined with said at least one dynamically loadable programmable rule, the FSM, and associated processing actions, wherein said at least one SmartPass comprises electronically dynamically assign said at least one dynamically loadable programmable rule based on at least one or more of:

said at least one shipment data of an individual shipment, or a pre-determined need.

9. The system according to claim 6, wherein said system configured to electronically deploy the FSM comprises being configured to electronically deploy at least one app node service.

10. The system according to claim 6, wherein the system configured to comprise said at least one app node service comprises being configured to include a YAML App Node Service, and wherein said system configured to deploy comprises being configured to at least one or more of:

electronically deploy to a run-time service environment;

wherein said YAML App Node Service comprises being configured to automatically code generate based on a YAML form template design, wherein said YAML form template design is configured to be designed specifically for said YAML App Node Service based on a differing Rule Set contents and unique FSM state name;

wherein said YAML App Node Service comprises being configured to include a cluster service comprising being configured to include at least one or more of:

a cluster container manager, a processor of at least one cluster service API deployable as a container cluster service, or a KUBERNETES container cluster service; or being configured to electronically create and deploy a newly created and deployed FSM state-based Rules and App Node Services in a cluster environment, with managed KUBERNETES containers;

being configured to electronically install a change to a Rule Set of a running App Node Service, a new App Node Service with a new Asset State Engine instance, and to create an updated Rule Set executed in a Container Cluster;

being configured to electronically execute a new App Node Service alongside an older version App Node Service, with no interaction between said App Node Services in the same environment, wherein both said App Node services are being configured to execute at the same time, at least one other service using said App Node Services comprising being configured to at least one or more of:

electronically interact with said new App Node Service; or electronically interact with said old App Node Service.

11. A computer program product embodied on a computer accessible nontransitory storage medium, including at least one instruction, which when executed on at least one electronic computer processor performs a method of electronically codifying data or a program using a rule-based and state-based application program or software component for automatic deployment in a distributed computing environment, comprising at least one electronic computer processor coupled to at least one electronic memory storage device and coupled via at least one communications network interface to at least one data communications network, the method comprising:

electronically programming and assigning of production rules as code used for processing data and events for shipment of various cargo at a port through customs processing and finance processing referred to as supply chain financing in the distributed computing environment;

electronically programming a finite state machine (FSM) to implement the state-based application program or software component;

electronically deploying the FSM comprising:

collecting of at least one distributed software app node service;

wherein each of said at least one distributed software app node services comprises:

at least a single state of the FSM; and at least one dynamically loadable programmable rule; and electronically receiving at least one shipment data, wherein said at least one shipment data comprises data electronically collected from at least one data source.

12. The computer program product, wherein the method according to claim 11, comprises: wherein said at least one data source comprises at least one or more of:

electronic data interchange (EDI), other Enterprise Resource Planning (ERP) messaging, web service application programming interface (API) calls, Internet Of Things (IoT) messaging, remote file copy, or tracking sensors.

13. The computer program product according to claim 11, wherein the method comprises wherein said at least one shipment data comprises:

electronically aggregating said at least one shipment data comprising at least one SmartPass comprising said at least one shipment data combined with said at least one dynamically loadable programmable rule, the FSM, and associated processing actions, wherein said at least one SmartPass comprises electronically dynamically assigning said at least one dynamically loadable programmable rule based on at least one or more of:

said at least one shipment data of an individual shipment, or a pre-determined need.

14. The computer program product according to claim 11, wherein the method comprises wherein said electronically deploying the FSM comprises electronically deploying at least one app node service.

15. The computer program product according to claim 11, wherein the method comprises wherein said at least one app node service comprises a YAML App Node Service, and wherein said deploying comprises at least one or more of:

electronically deploying to a run-time service environment;

wherein said YAML App Node Service comprises being automatically code generated based on a YAML form template design, wherein said YAML form template design is designed specifically for said YAML App Node Service based on a differing Rule Set contents and unique FSM state name;

wherein said YAML App Node Service comprises a cluster service comprising at least one or more of:

a cluster container manager, a processor of at least one cluster service API deployable as a container cluster service, or a KUBERNETES container cluster service; or electronically creating and deploying a newly created and deployed FSM state-based Rules and App Node Services in a cluster environment, with managed KUBERNETES containers;

electronically installing a change to a Rule Set of a running App Node Service, a new App Node Service with a new Asset State Engine instance, and creating an updated Rule Set executed in a Container Cluster;

electronically executing a new App Node Service alongside an older version App Node Service, with no interaction between said App Node Services in the same environment, wherein both said App Node services are executing at the same time, at least one other service using said App Node Services comprise at least one or more of:

electronically interacting with said new App Node Service; or electronically interacting with said old App Node Service.

* * * * *